United States Patent
Hirokane et al.

(10) Patent No.: US 6,927,275 B2
(45) Date of Patent: Aug. 9, 2005

(54) PROCESS FOR PRODUCING POLYESTER RESINS

(75) Inventors: Takeshi Hirokane, Kanagawa (JP); Tsuyoshi Ikeda, Kanagawa (JP); Shojiro Kuwahara, Kanagawa (JP); Takamasa Kawashima, Kanagawa (JP); Tomohito Oyama, Kanagawa (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 143 days.

(21) Appl. No.: 10/659,397

(22) Filed: Sep. 11, 2003

(65) Prior Publication Data

US 2004/0059084 A1 Mar. 25, 2004

(30) Foreign Application Priority Data

Sep. 24, 2002 (JP) ........................................ 2002-277504

(51) Int. Cl.$^7$ .............................................. C08G 63/66
(52) U.S. Cl. ....................... 528/300; 528/307; 528/308; 528/308.6; 528/406
(58) Field of Search ................................ 528/300, 307, 528/308, 308.6, 406

(56) References Cited

U.S. PATENT DOCUMENTS

| | | | |
|---|---|---|---|
| 2,945,008 A | | 7/1960 | Caldwell et al. |
| 3,827,320 A | | 8/1974 | Parks |
| 3,963,800 A | * | 6/1976 | Gipp et al. ................. 525/444 |
| 4,004,878 A | | 1/1977 | Magosch et al. |
| 6,274,696 B1 | | 8/2001 | Bonte et al. |
| 6,653,440 B2 | * | 11/2003 | Hirokane et al. ........... 528/406 |
| 6,740,376 B2 | * | 5/2004 | Oguro et al. .............. 428/35.7 |
| 2002/0028904 A1 | | 3/2002 | Dhawan et al. |
| 2003/0100702 A1 | * | 5/2003 | Hirokane et al. ........... 528/272 |
| 2003/0195303 A1 | * | 10/2003 | Ikeda et al. ................. 525/418 |

FOREIGN PATENT DOCUMENTS

| | | |
|---|---|---|
| EP | 1 164 155 | 12/2001 |
| JP | 62-265361 | 11/1987 |
| JP | 4-201431 | 7/1992 |
| JP | 1 262 524 | 12/2002 |

OTHER PUBLICATIONS

Communication and European Search Report mailed Mar. 10, 2004 for EP No. 03 02 0131.

* cited by examiner

*Primary Examiner*—Susan Berman
(74) *Attorney, Agent, or Firm*—Antonelli, Terry, Stout & Kraus, LLP

(57) ABSTRACT

The process of the present invention for producing a polyester resin comprising a dicarboxylic acid constitutional unit and a diol constitutional unit having a cyclic acetal skeleton comprises a step (1) of subjecting a diol (A) having a cyclic acetal skeleton and an ester (D) to transesterification reaction and a step (2) of mainly converting the resultant oligomer into a high polymer. The step (1) simultaneously satisfies the requirements (i) to (iv) as described in the specification. In the process of the present invention, the polyester resins having excellent moldability and mechanical properties are stably produced by a transesterification method which is less detrimental to environments.

10 Claims, No Drawings

PROCESS FOR PRODUCING POLYESTER RESINS

BACKGROUND OF THE INVENTION

1. Field of the Invention

The present invention relates to a process for producing a polyester resin comprising a dicarboxylic acid constitutional unit, a diol constitutional unit having a cyclic acetal skeleton, and optionally a diol constitutional unit having no cyclic acetal skeleton.

2. Description of the Prior Art

Polyethylene terephthalate (hereinafter occasionally referred to as "PET") has been extensively used as films, sheets, hollow containers, etc., because of its excellent transparency, mechanical properties, melt stability, solvent resistance, fragrance retention property and recyclability. However, PET is not necessarily good in heat resistance and, therefore, various modifications are made thereon by copolymerization.

In general, it is known that polymers modified with a compound having a cyclic acetal skeleton are improved in heat resistance, adhesion property, flame retardancy, etc., owing to the rigid structure and acetal bond of the cyclic acetal.

For instance, U.S. Pat. No. 2,945,008 describes that PET modified with 3,9-bis(1,1-dimethyl-2-hydroxyethyl)-2,4,8,10-tetraoxaspiro[5.5]undecane exhibits a high glass transition point and is excellent in heat resistance. Japanese Patent No. 2971942 discloses a container made of a copolyester produced from terephthalic acid, 1,4-butane diol and a glycol having a cyclic acetal skeleton which is excellent in transparency and heat resistance, as well as a method for producing the container. In addition, Japanese Patent No. 1979830 discloses a polyester produced using a diol having a cyclic acetal skeleton as an example for polyesters excellent in heat resistance and transparency.

Regarding the utilization of the adhesion property due to acetal bond, Japanese Patent Nos. 1843892, 1855226 and 1902128 and Japanese Patent Application Laid-Open No. 4-88078 disclose a polyester-based adhesive, adhesive composition and coating agent which are produced using a diol or dicarboxylic acid having a cyclic acetal skeleton.

In addition, polyesters produced using a dicarboxylic acid or diol having a cyclic acetal skeleton are disclosed as a polyester combined filament yarn with shrinkage difference, for example, in Japanese Patent Application Laid-Open No. 3-130425, as a modified polyester film, for example, in Japanese Patent Application Laid-Open No. 8-104742, as a biodegradable polyester, for example, in Japanese Patent Application Laid-Open No. 9-40762, as an electrostatic developing toner, for example, in Japanese Patent No. 1652382, and as a flame retardant resin composition, for example, in Japanese Patent Application Laid-Open No. 2000-344939.

Polyester resins are generally produced by a direct esterification method in which a dicarboxylic acid is reacted with an excess amount of diol to form an ester thereof, and then the resulting ester is polycondensed under reduced pressure to a polyester; or by a transesterification method in which an ester produced from a dicarboxylic acid and an alcohol is transesterified with an excess amount of diol to an ester of the dicarboxylic acid and the diol, and then the resulting ester is polycondensed under reduced pressure to a polyester. The direct esterification method is industrially advantageous in the production of PET as compared to the transesterification method because terephthalic acid is cheaper than dimethyl terephthalate. Further, the direct esterification method requires no catalyst for producing the ester of a dicarboxylic acid and a diol, thereby providing a high-quality polyester containing a less amount of impurities such as catalyst residues. Thus, the direct esterification method is more advantageous as compared to the transesterification method. In addition, the by-product in the formation of the ester of a dicarboxylic acid and a diol is alcohol for the transesterification method, and water for the direct esterification method. Therefore, the direct esterification method is less detrimental to environments as compared to the transesterification method.

However, in the production of a polyester resin containing a diol constitutional unit having a cyclic acetal skeleton by an ordinary direct esterification method, the cyclic acetal skeleton tends to be decomposed by the action of carboxyl groups and water in the reaction system to provide a polyester having a considerably broad molecular weight distribution or a gelated polyester. The moldability, mechanical properties, etc. of such a polyester are much more poor as compared to a corresponding polyester produced by the transesterification method.

Among the above patent documents, only Japanese Patent Application Laid-Open No. 3-130425 is concerned with the direct esterification method, but fails to specifically describe the production conditions and the ring opening reaction of the cyclic acetal skeleton caused by dicarboxylic acid.

Recently, a strong attention has been paid to the recycling of PET, especially to the chemical recycling thereof, and many PET chemical recycling methods have been proposed (for example, Japanese Patent Application Laid-Open Nos. 2002-60543, 2002-60369 and 2002-167469).

The method for producing polyester resins using bis(β-hydroxyethyl) terephthalate (hereinafter occasionally referred to as "BHET") recovered from PET by chemical recycling method, not only is less detrimental to environments, but also is industrially useful. In addition, BHET is substantially free from the acid end groups derived from the dicarboxylic acid and, therefore, is suitable as a raw material for the production of polyesters containing a diol constitutional unit having a cyclic acetal skeleton. However, any of the above patent documents fail to disclose the method of producing polyesters containing a diol constitutional unit having a cyclic acetal skeleton by using, as a raw material, an ester of a dicarboxylic acid with a diol which is obtained by depolymerizing a polycondensed product.

SUMMARY OF THE INVENTION

In view of the above problems, an object of the present invention is to provide an industrially useful process for stably producing polyester resins with an excellent moldability and mechanical properties comprising a dicarboxylic acid constitutional unit and a diol constitutional unit having a cyclic acetal skeleton without causing the decomposition of the cyclic acetal skeleton by the carboxyl groups of the dicarboxylic acid and water, thereby preventing the gelation of the polyester resin and the remarkable broadening of the molecular weight distribution.

As a result of extensive researches in view of the above objects, the inventors have found that a polyester resin with an excellent moldability and mechanical properties comprising a dicarboxylic acid constitutional unit, a diol constitutional unit having a cyclic acetal skeleton, and optionally a diol constitutional unit having no cyclic acetal skeleton is stably produced by a process comprising:

an oligomerization step (step (1)) of mainly producing oligomers by subjecting a diol (A) having a cyclic acetal skeleton and an ester (D) to transesterification reaction under conditions simultaneously satisfying the following requirements (i) to (iv):

(i) a molar ratio, b/a, of 0 to 0.035, wherein a is a molar amount of the dicarboxylic acid constitutional unit in the ester (D) and b is a molar amount of free carboxyl group in the ester (D);

(ii) a molar ratio, c/a, of 0.05 to 0.60 at initial charge, wherein a is the same as defined above and c is a molar amount of the diol (A) having a cyclic acetal skeleton;

(iii) the following formula (I):

$$0 \leq (b/a) \times (c/a) \leq 0.003 \qquad (I)$$

wherein a, b and c are as defined above; and (iv) a water content of 0 to 0.5% by weight in the reaction system; and a step (step (2)) of mainly polymerizing the oligomers to the polyester, without causing the decomposition of the cyclic acetal skeleton, thereby preventing the molecular weight distribution from being too broadened and the polyester resin from being gelated.

The present invention has been accomplished on the basis of this finding.

Thus, the present invention provides:

a process for producing a polyester resin comprising a dicarboxylic acid constitutional unit and a diol constitutional unit having a cyclic acetal skeleton, the process comprising:

an oligomerization step of mainly producing oligomers by subjecting a diol (A) having a cyclic acetal skeleton and an ester (D) to transesterification reaction under conditions simultaneously satisfying the following requirements (i) to (iv):

(i) a molar ratio, b/a, of 0 to 0.035, wherein a is a molar amount of the dicarboxylic acid constitutional unit in the ester (D) and b is a molar amount of free carboxyl group in the ester (D);

(ii) a molar ratio, c/a, of 0.05 to 0.60 at initial charge, wherein a is the same as defined above and c is a molar amount of the diol (A) having a cyclic acetal skeleton;

(iii) the following formula (I):

$$0 \leq (b/a) \times (c/a) \leq 0.003 \qquad (I)$$

wherein a, b and c are as defined above; and (iv) a water content of 0 to 0.5% by weight in the reaction system; and a step of mainly polymerizing the oligomers to the polyester.

DETAILED DESCRIPTION OF THE INVENTION

The process of the present invention will be described in detail below.

The process for producing a polyester resin according to the present invention comprises the step (1) of subjecting the diol (A) having a cyclic acetal skeleton and the ester (D) to transesterification reaction to produce oligomers; and the step (2) of polymerizing the oligomer to the polyester. The step (1) should simultaneously satisfy the following requirements (i) to (iv):

(i) a molar ratio, b/a, of 0 to 0.035, wherein a is a molar amount of the dicarboxylic acid constitutional unit in the ester (D) and b is a molar amount of free carboxyl group in the ester (D);

(ii) a molar ratio, c/a, of 0.05 to 0.60 at initial charge, wherein a is the same as defined above and c is a molar amount of the diol (A) having a cyclic acetal skeleton;

(iii) the following formula (I):

$$0 \leq (b/a) \times (c/a) \leq 0.003 \qquad (I)$$

wherein a, b and c are as defined above; and (iv) a water content of 0 to 0.5% by weight in the reaction system.

The process for producing a polyester rein according to the present invention may be carried out in conventionally known apparatuses for producing polyesters without any modification.

The ester (D) used in the step (1) has a molar ratio, b/a, of the amount (b mol) of the free carboxyl group to the amount (a mol) of the dicarboxylic acid constitutional unit of 0 to 0.035. By controlling the molar ratio (b/a) of the ester (D) to the above range, the decomposition of the diol (A) having a cyclic acetal skeleton by the free carboxyl groups can be prevented in the production of the oligomers from the ester (D) and the diol (A). By preventing the decomposition of the diol (A), the polyester resin is produced without causing gelation and remarkable broadening of the molecular weight distribution. As a result, the resultant polyester resin acquires excellent mechanical properties, and also excellent moldability and fabricability. The molar ratio (b/a) is preferably 0 to 0.020, more preferably 0 to 0.010.

When the molar ratio (c/a) of the amount (c mol) of the diol (A) having a cyclic acetal skeleton to the amount (a mol) of the dicarboxylic acid constitutional unit in the ester (D) is controlled to 0.05 to 0.60 at the initial charge in the step (1), the copolymerization rate of the diol (A) in the resultant polyester resin becomes 5 to 60 mol % to enhance various properties such as transparency, mechanical properties and heat resistance. In view of attaining excellent properties, the molar ratio (c/a) is preferably 0.10 to 0.55 and more preferably 0.20 to 0.45.

The decomposition of the diol (A) having a cyclic acetal skeleton due to the free carboxyl groups in the ester (D) comes to occur more frequently with increasing copolymerization rate of the diol (A) in the polyester resin. To avoid this drawback, the molar ratios (b/a) and (c/a) should satisfy the following formula (1):

$$0 \leq (b/a) \times (c/a) \leq 0.003 \qquad (I).$$

The product, (b/a)×(c/a), is preferably 0 to 0.0025, more preferably 0 to 0.0020, and still more preferably 0 to 0.0015. By regulating the product, (b/a)×(c/a), within the above range, the polyester resin is produced without causing decomposition of the diol (A).

By controlling the water content in the reaction system of the step (1) to 0 to 0.5% by weight, the diol (A) having a cyclic acetal skeleton is prevented from being decomposed by water in the production of the oligomers from the ester (D) and the diol (A). The water content in the reaction system of the step (1) is preferably 0 to 0.3% by weight and more preferably 0 to 0.1% by weight.

The diol (A) having a cyclic acetal skeleton for use in the present invention is not particularly limited, and preferably selected from the compounds represented by the formula (1) and (2):

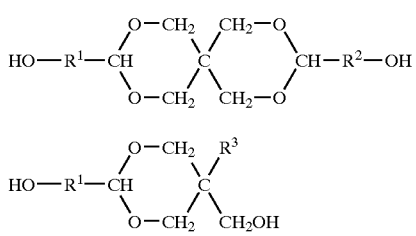

(1)

(2)

In the formulae (1) and (2), $R^1$ and $R^2$ are each independently a divalent hydrocarbon group selected from the group consisting of $C_1$–$C_{10}$ aliphatic hydrocarbon groups, $C_3$–$C_{10}$ alicyclic hydrocarbon groups and $C_6$–$C_{10}$ aromatic hydrocarbon groups, and preferably methylene group, ethylene group, propylene group, butylene group and their structural isomers such as isopropylene group and isobutylene group. $R^3$ is a monovalent hydrocarbon group selected from the group consisting of $C_1$–$C_{10}$ aliphatic hydrocarbon groups, $C_3$–$C_{10}$ alicyclic hydrocarbon groups and $C_6$–$C_{10}$ aromatic hydrocarbon groups, preferably methyl group, ethyl group, propyl group, butyl group or their structural isomers such as isopropyl group and isobutyl group.

Specific examples of the diol (A) include 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane.

The ester (D) having a molar ratio (b/a) of 0 to 0.035 is produced by any suitable method without particular limitations, for example, by the following methods (1) to (3).

In the method (1) for producing the ester (D), a dicarboxylic acid (B) and a diol (C) having no cyclic acetal skeleton as raw materials are reacted with each other to produce an ester (D1) having an average polymerization degree of 15 to 200. The average polymerization degree referred to herein means the value obtained by dividing a number-average molecular weight of the ester (D1) as measured by gel permeation chromatography by a molecular weight of a repeating constitutional unit of the ester (D1).

Examples of the dicarboxylic acid (B) usable in the method (1) include, but are not particularly limited to, aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralindicarboxylic acid. In view of mechanical properties and heat resistance of the polyester resin, preferred are aromatic dicarboxylic acids, and more preferred are terephthalic acid, 2,6-naphthalenedicarboxylic acid and isophthalic acid. Further, in view of production costs, most preferred is terephthalic acid. The above dicarboxylic acids may be used singly or in combination of two or more.

Examples of the diol (C) having no cyclic acetal skeleton usable in the method (1) include, but are not particularly limited to, aliphatic diols such as ethylene glycol, trimethylene glycol, 1,4-butanediol, 1,5-pentanediol, 1,6-hexanediol, diethylene glycol, propylene glycol and neopentyl glycol; polyether compounds such as polyethylene glycol, polypropylene glycol and polybutylene glycol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol and pentacyclododecane dimethanol; bisphenols such as 4,4'-(1-methylethylidene)bisphenol, methylene bisphenol (bisphenol F), 4,4'-cyclohexylidene bisphenol (bisphenol Z) and 4,4'-sulfonyl bisphenol (bisphenol S); alkyleneoxide adducts of bisphenols; aromatic dihydroxy compounds such as hydroquinone, resorcin, 4,4'-dihydroxybiphenyl, 4,4'-dihydroxybiphenyl ether and 4,4'-dihydroxybiphenyl benzophenone; and alkyleneoxide adducts of aromatic dihydroxy compounds. In view of mechanical properties of the polyester resin and production costs, preferred is ethylene glycol. These diols may be used singly or in combination of two or more.

Further, in the method (1), in addition to the above dicarboxylic acid and diol, there may also be used monocarboxylic acids such as benzoic acid, propionic acid and butyric acid; monohydric alcohols such as butyl alcohol, hexyl alcohol and octyl alcohol; and polyhydric (trihydric or more) alcohols such as trimethylolpropane, glycerol and pentaerythritol, unless the use thereof adversely affects the effects of the present invention.

The method (1) may be performed in the same manner as the oligomerization step of the conventional direct esterification methods for the production of polyester resins. The initial charge ratio of the diol (C) to the starting dicarboxylic acid (B) is 1.01 to 10, preferably 1.1 to 5, and more preferably 1.2 to 2 by mol. By setting the initial charge ratio within the above range, undesired side reactions such as etherification of the diol (C) by dehydration are effectively prevented. Other conditions such as reaction temperature and reaction pressure used in the method (1) may be the same as those employed in the oligomerization step of the conventional direct esterification methods for the production of polyester resins. The reaction pressure is preferably 10 to 500 kPa and the reaction temperature is preferably 80 to 270° C., more preferably 100 to 240° C. and still more preferably 150 to 230° C., although not limited thereto.

The method (1) may be conducted in the absence of a catalyst or in the presence of a catalyst in an amount of 0.0001 to 5 mol % of the dicarboxylic acid (B). As the catalyst, there may be used conventionally known catalysts. Examples thereof include, but are not particularly limited to, alkoxides of sodium or magnesium; fatty acid salts, carbonates, phosphates, hydroxides, chlorides or oxides of zinc, lead, cerium, cadmium, manganese, cobalt, lithium, sodium, potassium, calcium, nickel, magnesium, vanadium, aluminum, titanium, germanium, antimony or tin; and metallic magnesium. These catalysts may be used singly or in combination of two or more.

The end point of the method (1) is determined by monitoring the molar ratio (b/a) of the free carboxyl groups (b mol) to the dicarboxylic acid constitutional unit (a mol) in the ester (D1). Namely, the method (1) is continued until the molar ratio (b/a) reaches 0 to 0.035 and the relationship between the amount (c mol) of the diol (A) having a cyclic acetal skeleton which is to be used in the subsequent step (1) satisfies the following formula (I):

$$0 \leq (b/a) \times (c/a) \leq 0.003 \tag{I}.$$

If the molar ratio (b/a) is not sufficiently reduced and the formula (I) is not satisfied by utilizing only the oligomerization of the conventional direct esterification methods for the production of polyester resins, it is necessary to successively conduct the polycondensation so as to sufficiently reduce the molar ratio (b/a), thereby satisfying the formula (I). The polycondensation reaction may be conducted in the same manner as in the conventionally known method. For example, the polycondensation reaction may be initiated after the conversion of the dicarboxylic acid, which is calculated from the amount of water produced, reaches preferably 85 mol % or higher, more preferably 90 mol % or higher and still more preferably 95 mol % or higher. The polycondensation reaction may be performed in the absence of a catalyst or in the presence of a catalyst in an amount of 0.0001 to 5 mol % based on the dicarboxylic acid (B). The catalyst for the polycondensation reaction may be one or more catalysts selected from the catalysts for the oligomerization step. The polycondensation reaction may be conducted in the same manner as in the direct esterification methods for production of polyester resins. For example, the reaction temperature is gradually raised, preferably until finally reaching 200 to 300° C., and the reaction pressure is gradually lowered, preferably until finally reaching 10 kPa or lower.

In the method (1), orthoformic acid triester and/or carbonic acid diester may be added in an amount of 0.01 to 0.2 mol per one mole of the dicarboxylic acid (B). Such an addition further reduces the molar ratio (b/a) of the free carboxyl groups (b mol) to the dicarboxylic acid constitutional unit (a mol) in the ester (D1). Examples of the orthoformic acid triester include trimethyl orthoformate and triethyl orthoformate, with trimethyl orthoformate being preferred. Examples of the carbonic acid diesters include dimethyl carbonate and diethyl carbonate, with dimethyl carbonate being preferred. The orthoformic acid triester and/or carbonic acid diester may be added at any stage of the method (1), for example, effectively added after the oligomerization step or after the polycondensation step, although not limited thereto.

In the method (2) for production of the ester (D), the ester (D1) is depolymerized with the diol (C) having no cyclic acetal skeleton until reaching an average polymerization degree of 2 to less than 15 and a melting point of 150 to 240° C., thereby obtaining an ester (D2).

The depolymerization of the ester (D1) in the method (2) is conducted by using 0.1 to 10 mol, preferably 0.3 to 5 mol and more preferably 0.5 to 3 mol of the diol (C) per one mole of the dicarboxylic acid constitutional unit in the ester (D1). The reaction temperature is 150 to 250° C., preferably 180 to 230° C., and the reaction pressure is 50 to 500 kPa, preferably 100 to 300 kPa. The depolymerized product preferably has an average polymerization degree of 2 to less than 15, and a melting point of 150 to 240° C. By conducting the depolymerization of the ester (D1) under the above conditions, undesired side reactions such as etherification of the diol (C) by dehydration can be avoided.

The depolymerization reaction of the method (2) may be conducted in the absence of a catalyst or in the presence of a catalyst in an amount of 0.0001 to 5 mol % of the dicarboxylic acid constitutional unit in the ester (D1). The catalyst for the depolymerization reaction may be one or more catalysts selected from the catalysts for the method (1).

Upon the depolymerization of the ester (D1), the esterification of the end carboxyl groups in the ester (D1) occurs simultaneously. Therefore, the molar ratio (b/a) of the ester (D2) to be obtained by the depolymerization is smaller than that of the ester (D1). Water produced during the esterification caused simultaneously with the depolymerization may be distilled off to effectively reduce the molar ratio (b/a) of the ester (D1). In addition, the melting point of the ester (D1) may be effectively reduced by the depolymerization. The melting point of the ester (D2) is 150 to 240° C., preferably 230° C. or lower, still more preferably 220° C. or lower and most preferably 210° C. or lower. When the melting point of the ester (D2) is controlled to the above range, the reaction temperature in the subsequent step (1) can be suitably reduced to 240° C. or lower, which preferably prevents the thermal decomposition of the diol (A) having a cyclic acetal skeleton in the step (1).

When the molar ratio of the diol constitutional unit to the dicarboxylic acid constitutional unit in the depolymerized product is more than 3.0, the diol (C) should be distilled off at 150 to 250° C. under 0.5 to 100 kPa until the molar ratio is reduced to 3.0 or lower. However, even when the molar ratio of the diol constitutional unit to the dicarboxylic acid constitutional unit in the decomposed product is 3.0 or lower, the diol (C) may be distilled off under the same conditions as above to further reduce the molar ratio.

The molar ratio of the diol constitutional unit to the dicarboxylic acid constitutional unit in the ester (D2) thus obtained is 1.1 to 3.0, preferably 2.0 or lower, more preferably 1.7 or lower and most preferably 1.5 or lower. By regulating the molar ration within the above range, undesired side reactions such as etherification by dehydration can be effectively prevented in the subsequent step (1).

Like the method (1), an orthoformic acid triester and/or a carbonic acid diester may be used in the method (2) in an amount of 0.01 to 0.2 mol per one mole of the dicarboxylic acid (B). The orthoformic acid triester and/or the carbonic acid diester may be added at any stage of the method (2), for example, effectively added after the oligomerization step, after the polycondensation step, or during or after the depolymerization step, although not limited thereto.

The ester to be depolymerized in the method (2) may be another polyester resin (D11) in place of the ester (D1). Examples of the polyester resins (D11) include, but are not particularly limited to, polyethylene terephthalate, polybutylene terephthalate, polyethylene naphthalate, and polyethylene terephthalates copolymerized with isophthalic acid, 1,4-cyclohexane dimethanol, 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

In the method (3) for production of the ester (D), a dicarboxylic acid dialkyl ester (E) is transesterified with the diol (C) having no cyclic acetal skeleton to an ester (D3).

Examples of the dicarboxylic acid dialkyl ester (E) include, but are not particularly limited to, aliphatic dicarboxylic acid dimethyl esters such as dimethyl succinate, dimethyl glutarate, dimethyl adipate, dimethyl pimelate, dimethyl suberate, dimethyl azelate, dimethyl sebacate, dimethyl dodecanedicarboxylate, dimethyl cyclohexanedicarboxylate, dimethyl decanedicarboxylate, dimethyl norbornanedicarboxylate, dimethyl tricyclodecanedicarboxylate and dimethyl pentacyclododecanedicarboxylate; and aromatic dicarboxylic acid dimethyl esters such as dimethyl terephthalate, dimethyl isophthalate, dimethyl phthalate, dimethyl 2-methylterephthalate, dimethyl 1,4-naphthalenedicarboxylate, dimethyl 1,5-naphthalenedicarboxylate, dimethyl 2,6-naphthalenedicarboxylate, dimethyl 2,7-naphthalenedicarboxylate, dimethyl biphenyldicarboxylate and dimethyl tetralindicarboxylate. In view of mechanical properties and heat resistance of the obtained polyester resin, preferred are aromatic dicarboxylic acid dimethyl esters, and more preferred are dimethyl terephthalate, dimethyl 2,6-naphthalenedicarboxylate and dimethyl isophthalate. Further, in view of economical productions, most preferred is dimethyl terephthalate. These dicarboxylic acid dimethyl esters may be used singly or in combination of two or more.

The details of the diol (C) having no cyclic acetal skeleton to be used in the method (3) have been described above with respect to the method (1).

The method (3) may be performed in the same manner as in the oligomerization step of the conventional transesterification method for the production of polyester resins. The charge ratio by mol of the diol (C) to the dicarboxylic acid dialkyl ester (E) is 1.01 to 10, preferably 1.3 to 6, and more preferably 1.6 to 3. The reaction temperature and reaction pressure used in the method (3) may be the same as those used in the oligomerization step of the conventional transesterification method for the production of polyester resins. For example, the reaction pressure is 10 to 500 kPa although not specifically limited thereto, and the reaction temperature is 80 to 270° C., preferably 100 to 240° C. and more preferably 150 to 230° C.

The method (3) may be performed in the absence of a catalyst or in the presence of a catalyst in an amount of 0.0001 to 5 mol % of the dicarboxylic acid dialkyl ester (E). The catalyst for the method (3) may be one or more catalysts selected from the catalysts for the method (1).

The method (3) is continued until the conversion of the dicarboxylic acid dialkyl ester (E) reaches 85 mol % or higher, preferably 88 mol % or higher and more preferably 90 mol % or higher. The conversion is calculated from the amount of alcohol being generated.

In the ester (D3) obtained by the method (3), the molar ratio of the diol constituting unit having no cyclic acetal skeleton to the dicarboxylic acid constitutional unit is preferably 1.1 to 2.0, more preferably 1.6 mol or lower and most preferably 1.4 mol or lower. To control the molar ratio of the diol constituting unit to the dicarboxylic acid constitutional unit within the above range, it is recommended to distill off the diol (C) at 150 to 250° C. under 0.5 to 100 kPa in the method (3), preferably after the conversion of the dicarboxylic acid dialkyl ester (E) reaches 85 mol % or higher. By controlling the molar ratio within the above range, undesired side reactions such as the etherification of the diol component by dehydration can be effectively prevented in the subsequent step (1).

As the ester (D), there may be also usable bis(β-hydroxyethyl) terephthalate (ester (D4)) that is chemically recycled from polyethylene terephthalate.

Further, as the ester (D), there may be also usable a mixture of two or more esters selected from the ester (D1) obtained by the method (1), the ester (D2) obtained by the method (2), the ester (D3) obtained by the method (3) and the ester (D4). These esters are blended such that the molar ratio (b/a) of the free carboxyl groups (b mol) to the dicarboxylic acid constitutional unit (a mol) in the mixture is 0 to 0.035 and that the relationship between the amount (c mol) of the diol (A) having a cyclic acetal skeleton which is to be used in the subsequent step (1) satisfies the following formula (I):

$$0 \leq (b/a) \times (c/a) \leq 0.003 \quad (I)$$

wherein a, b and c are the same as defined above.

In the step (1) of the process for the production of polyester resins according to the present invention, the ester (D) is allowed to react with the diol (A) having a cyclic acetal skeleton mainly by the transesterification to produce an oligomer composed of the dicarboxylic acid constitutional unit, the diol constitutional unit having a cyclic acetal skeleton and the diol constitutional unit having no cyclic acetal skeleton.

In the step (1), the ester (D) and the diol (A) having a cyclic acetal skeleton are charged in a charging ratio (c/a) of 0.05 to 0.60, wherein a is a molar amount of the dicarboxylic acid constitutional unit in the ester (D) and c is a molar amount of the diol (A). By setting the charging ratio of the ester (D) and the diol (A) within the above range, the copolymerization rate of the diol (A) in the resultant polyester resin becomes 5 to 60 mol % to enhance various properties such as transparency, mechanical properties and heat resistance.

The step (1) may be conducted in the absence of a catalyst or in the presence of a catalyst in an amount of 0.0001 to 5 mol % of the dicarboxylic acid constitutional unit in the ester (D). The catalyst for the step (1) may be one or more catalysts selected from the catalysts for the method (1).

In the step (1), the reaction pressure is 10 to 500 kPa although not particularly limited thereto, and the reaction temperature is preferably 80 to 240° C., more preferably 100 to 235° C. and most preferably 150 to 230° C.

In the step (1), the diol (C) having no cyclic acetal skeleton which is generated by the transesterification reaction between the ester (D) and the diol (A) may be removed from the reaction system by distillation, because the transesterification between the ester (D) and the diol (A) is advantageously promoted. It is recommended to continue the removal of the diol (C) from the reaction system by distillation until the molar ratio of the diol constitutional unit having a cyclic acetal skeleton to the dicarboxylic acid constitutional unit in the oligomers reaches preferably 1.1 to 2.0, more preferably 1.6 or lower, and most preferably 1.4 or lower.

The step (1) may be continued until the transesterification rate of the ester (D) with the diol (A) reaches 50 mol % or higher, preferably 70 mol % or higher and more preferably 90 mol % or higher.

In the step (2), the oligomer produced in the step (1) is polycondensed under reduced pressure to a high polymer. The step (2) may be performed in the same manner as in the polycondensation step of the conventional process for the production of polyester resins. For example, the reaction pressure is gradually reduced to about 0.1 to 300 Pa finally. A final reaction pressure in the polycondensation reaction exceeding 300 Pa is unfavorable, because the polycondensation reaction rate may fail to be sufficiently increased. The temperature of the polycondensation reaction system is gradually heated so as to conduct the polycondensation reaction preferably at 190 to 300° C. When the polycondensation reaction temperature is raised to more than 300° C., undesired side reactions such as thermal decomposition of the reaction products tend to occur.

The step (2) may be conducted in the absence of a catalyst or in the presence of a catalyst in an amount of 0.0001 to 5 mol % of the dicarboxylic acid constitutional unit in the oligomer. The catalyst for the step (2) may be one or more catalysts selected from the catalysts for the method (1).

In the process for the production of polyester resins according to the present invention, there may be used conventionally known additives such as etherification inhibitors, various stabilizers such as heat stabilizers, polymerization modifiers, etc. Examples of the etherification inhibitors include amine compounds, and examples of the heat stabilizers include phosphoric acid, phosphorous acid and phenylphosphonic acid. In addition, other additives such as light stabilizers, antistatic agents, lubricants, antioxidants and mold releasing agents may be used.

The polyester resin obtained by the process of the present invention has a molecular weight distribution (Mw/Mn) of preferably 2.5 to 12.0, more preferably 2.5 to 7.0 and still more preferably 2.5 to 5.0. When the molecular weight distribution lies in the above range, the polyester resin is suitably used as a molding material for injection molding, extrusion, etc.

The present invention will be described in more detail by reference to the following examples. However, it should be noted that the following examples are only illustrative and not intended to limit the invention thereto. The evaluation methods used herein are as follows. Evaluation of Ester (D)
(1) Molar Ratio (b/a) of Free Carboxyl Groups to Dicarboxylic Acid Constitutional Unit Accurately weighed 1 g of ester (D) was dissolved in 50 ml of an o-cresol/chloroform/1,1,2,2-tetrachloroethane (70:15:15 by mass) mixed solution. The resultant solution was subjected to potentiometric titration with a 0.1 N potassium hydroxide in ethanol using an automatic titrator "COM-2000" available from Hiranuma Sangyo Co., Ltd.
(2) Average Polymerization Degree Into 20 g of a chloroform/1,1,1,3,3,3-hexafluoro-2-propanol (99:1 by mass) mixed solvent, was dissolved 20 μg of ester (D). The resultant solution was subjected to gel permeation chromatography (GPC) with calibration by a standard polystyrene. The GPC measurement was conducted using a GPC apparatus "TOSOH 8020" equipped with two columns "TSK GMHHR-L" and one column "TSK G5000HR" all available from Tosoh Corporation, by setting a column temperature at 40° C. Chloroform as an eluent was flowed through the columns at a rate of 1.0 ml/min, and the elute was measured by a UV detector.
Evaluation of Reactants at Initiation of Step (1)
(1) Molar Ratio (c/a) of Diol (A) Having Cyclic Acetal Skeleton to Dicarboxylic Acid Constitutional Unit in Ester (D)

Into 1 g of a heavy chloroform/heavy trifluoroacetic acid (95:5 by mass) mixed solvent, was dissolved 20 mg of a reactant mixture. The resultant solution was subjected to $^1$H-NMR measurement to obtain an NMR curve. The molar ratio (c/a) was calculated from the peak area ratio. The $^1$H-NMR measurement was conducted using "NM-AL400" available from Nippon Denshi Co., Ltd., at 400 MHz.
(2) Water Content Water vaporized from accurately weighed 0.1 g of a reactant mixture in a vaporizer was measured by a water analyzer under nitrogen flow. The measurement was conducted using a trace water analyzer "CA-05 Model" available from Mitsubishi Chemical Corp. at a nitrogen flow rate of 200 ml/min for 30 min by setting the vaporizer at 235° C.
Evaluation of Polyester Resin
(1) Number-Average Molecular Weight and Molecular Weight Distribution Into 20 g of chloroform, was dissolved 20 μg of polyester resin. The resultant solution was subjected to gel permeation chromatography (GPC) with calibration by a standard polystyrene. The GPC measurement was conducted using a GPC apparatus "TOSOH 8020" equipped with two columns "TSK GMHHR-L" and one column "TSK G5000HR" all available from Tosoh Corporation, by setting a column temperature at 40° C. Chloroform as an eluent was flowed through the columns at a rate of 1.0 ml/min, and the elute was measured by a UV detector.
(2) Copolymerization Rate of Diol Having Cyclic Acetal Skeleton Into 1 g of heavy chloroform, was dissolved 20 mg of polyester resin. The resultant solution was subjected to $^1$H-NMR measurement to obtain an NMR curve. The copolymerization rate of the diol having a cyclic acetal skeleton was calculated from the peak area ratio. The $^1$H-NMR measurement was conducted using "NM-AL400" available from Nippon Deishi Co., Ltd., at 400 MHz.
(3) Appearance of Molded Article The polyester resin was molded into a disk having a thickness of 3.2 mm and a diameter of 100 mm using a screw injection-molding machine (screw diameter: 32 mm; clamping force: 9.8 kN) at a cylinder temperature of 240 to 280° C. and a mold temperature of 35° C. The molded disk was observed to examine whether or not gels were present.

EXAMPLES 1–4 AND COMPARATIVE EXAMPLES 1–3

The dicarboxylic acid and the diol having no cyclic acetal skeleton were charged at a molar ratio as shown in Table 1 and subjected to esterification reaction by an ordinary method. After completion of the esterification reaction, 0.01 mol % of antimony (III) oxide and 0.06 mol % of triethyl phosphate, each based on the dicarboxylic acid constitutional unit, were added to the ester, and then the ester was polycondensed by an ordinary method to obtain an ester (D1) (production method A).

The ester (D1) was mixed with a diol having a cyclic acetal skeleton in an amount shown in Table 1 and then 0.03 mol % of manganese acetate tetrahydrate based on the dicarboxylic acid constitutional unit. The resultant mixture was reacted at 215 to 265° C. under 13.3 kPa for 3 h to obtain an oligomer (step (1)).

Then, 0.01 mol % of antimony (III) oxide and 0.06 mol % of trimethyl phosphate, each based on the dicarboxylic acid constitutional unit in the oligomer, were added to the oligomer. The polycondensation of the oligomer was carried out at 270° C. under 133 Pa and terminated when a predetermined melt viscosity was reached, thereby obtaining a polyester resin (step (2)).

In the tables below, the following abbreviations are used:
PTA: terephthalic acid
PET: polyethylene terephthalate
BHET: bis(β-hydroxyethyl) terephthalate
DMT: dimethyl terephthalate
EG: ethylene glycol
SPG: 3,9-bis(1,1-dimethyl-2-hydroxyethyl)-2,4,8,10-tetraoxaspiro[5.5]undecane
DOG: 5-methylol-5-ethyl-2-(1,1-dimethyl-2-hydroxyethyl)-1,3-dioxane

TABLE 1

|  | Examples | | | |
| --- | --- | --- | --- | --- |
|  | 1 | 2 | 3 | 4 |
| Reactants charged | | | | |
| PTA (mol) | 26.0 | 26.0 | 26.0 | 26.0 |
| Eg (mol) | 31.2 | 39.0 | 52.0 | 104.1 |
| molar ratio | 1.2 | 1.5 | 2.0 | 4.0 |
| Ester (D1) | | | | |
| average polymerization degree | 35 | 70 | 25 | 18 |
| b/a | 0.030 | 0.005 | 0.010 | 0.020 |
| molar ratio | 1.15 | 1.05 | 1.20 | 1.40 |
| Step (1) | | | | |
| SPG (mol) | 1.3 | 14.3 | 6.5 | — |
| DOG (mol) | — | — | — | 2.6 |
| c/a | 0.05 | 0.55 | 0.25 | 0.10 |
| (b/a) × (c/a) | 0.0015 | 0.0028 | 0.0022 | 0.0020 |
| Water content (% by weight) | 0.05 | 0.10 | 0.05 | 0.30 |

TABLE 1-continued

Properties of polymers

| | | | | |
|---|---|---|---|---|
| Mn | 13500 | 10500 | 11500 | 13000 |
| Mw/Mn | 3.2 | 4.9 | 4.4 | 3.8 |
| Copolymerization rate (mol %) | 4.8 | 52.8 | 24.4 | 9.7 |
| Appearance of injection-molded article | Good | Good | Good | Good |

| | Comparative Examples | | |
|---|---|---|---|
| | 1 | 2 | 3 |
| Reactants charged | | | |
| PTA (mol) | 26.0 | 26.0 | 26.0 |
| EG (mol) | 31.2 | 39.0 | 52.0 |
| molar ratio | 1.2 | 1.5 | 2.0 |
| Ester (D1) | | | |
| average polymerization degree | 5 | 20 | 35 |
| b/a | 0.070 | 0.025 | 0.030 |
| molar ratio | 1.20 | 1.05 | 1.15 |
| Step (1) | | | |
| SPG (mol) | 1.3 | — | 14.3 |
| DOG (mol) | — | 3.9 | — |
| c/a | 0.05 | 0.15 | 0.55 |
| (b/a) × (c/a) | 0.0035 | 0.0038 | 0.0175 |
| Water content (%) | 0.10 | 0.10 | 0.70 |
| Properties of polymers | | | |
| Mn | 11500 | 12000 | 8500 |
| Mw/Mn | 10.2 | 11.3 | 16.4 |
| Copolymerization rate (mol %) | 4.6 | 14.1 | 49.1 |
| Appearance of molded article | gelled | gelled | non-moldable |

EXAMPLES 5–8

The respective esters (D1) obtained in Examples 1 to 4 were mixed with a diol having no cyclic acetal skeleton in an amount as shown in Table 2, and then depolymerized at 215° C. under ordinary pressure. After the reaction product became uniform, a predetermined amount of the diol having no cyclic acetal skeleton was distilled off at 215° C. under 13.3 kPa to obtain an ester (D2) (production method B).

The ester (D2) was subjected to the steps (1) and (2) in the same manner as in Example 1.

TABLE 2

| | Examples | | | |
|---|---|---|---|---|
| | 5 | 6 | 7 | 8 |
| Ester (D1) | | | | |
| produced in | Ex. 1 | Ex. 2 | Ex. 3 | Ex. 4 |
| average polymerization degree | 35 | 70 | 25 | 18 |
| b/a | 0.030 | 0.005 | 0.010 | 0.020 |
| molar ratio | 1.15 | 1.05 | 1.20 | 1.30 |
| Depolymerization | | | | |
| EG added (mol) | 22.1 | 24.7 | 20.8 | 18.2 |
| molar ratio | 2.00 | 2.00 | 2.00 | 2.00 |
| Ester (D2) | | | | |
| average polymerization degree | 10 | 12 | 10 | 10 |
| b/a | 0.014 | 0.002 | 0.004 | 0.009 |
| molar ratio | 1.40 | 1.40 | 1.40 | 1.40 |
| Step (1) | | | | |
| SPG (mol) | 1.3 | 14.3 | 6.5 | — |
| DOG (mol) | — | — | — | 2.6 |

TABLE 2-continued

| | Examples | | | |
|---|---|---|---|---|
| | 5 | 6 | 7 | 8 |
| c/a | 0.05 | 0.55 | 0.25 | 0.10 |
| (b/a) × (c/a) | 0.0007 | 0.0011 | 0.0010 | 0.0009 |
| Water content (%) | 0.05 | 0.10 | 0.05 | 0.30 |
| Properties of polymers | | | | |
| Mn | 13500 | 12000 | 14000 | 14500 |
| Mw/Mn | 2.7 | 3.5 | 3.0 | 2.9 |
| Copolymerization rate (mol %) | 4.8 | 54.0 | 24.7 | 9.9 |
| Appearance of injection-molded article | Good | Good | Good | Good |

EXAMPLES 9–10

The respective esters obtained in Examples 1 and 2 were mixed with 0.1 mol % of trimethyl orthoformate based on the dicarboxylic acid constitutional unit to obtain an ester (D1').

The ester (D1') was subjected to the steps (1) and (2) in the same manner as in Example 1.

EXAMPLES 11–12

The respective esters (D1) obtained in Examples 1 and 2 were mixed with a diol having no cyclic acetal skeleton in an amount as shown in Table 3, and then depolymerized at 215° C. under ordinary pressure. After the reaction product became uniform, a predetermined amount of the diol having no cyclic acetal skeleton was distilled off at 215° C. under 13.3 kPa, and then 0.1 mol % of trimethyl orthoformate based on the dicarboxylic acid constitutional unit was added to obtain an ester (D2').

The ester (D2') was subjected to the steps (1) and (2) in the same manner as in Example 1.

TABLE 3

| | Examples | | | |
|---|---|---|---|---|
| | 9 | 10 | 11 | 12 |
| Ester (D1) | | | | |
| produced in | Ex. 1 | Ex. 2 | Ex. 1 | Ex. 2 |
| average polymerization degree | 35 | 70 | 35 | 70 |
| b/a | 0.030 | 0.005 | 0.030 | 0.005 |
| molar ratio | 1.15 | 1.05 | 1.15 | 1.05 |
| Depolymerization | | | | |
| EG added (mol) | — | — | 22.1 | 24.7 |
| molar ratio | — | — | 2.00 | 2.00 |
| Ester (D2) | | | | |
| average polymerization degree | — | — | 10 | 12 |
| b/a | — | — | 0.014 | 0.002 |
| molar ratio | — | — | 1.40 | 1.40 |
| Esters (D1') and (D2') after adding trimethyl orthoformate | | | | |
| average polymerization degree | 35 | 70 | 10 | 12 |
| b/a | 0.025 | 0.003 | 0.010 | 0.001 |
| molar ratio | 1.15 | 1.05 | 1.40 | 1.40 |
| Step (1) | | | | |
| SPG (mol) | 1.3 | 14.3 | 1.3 | 14.3 |
| c/a | 0.05 | 0.55 | 0.05 | 0.55 |
| (b/a) × (c/a) | 0.0013 | 0.0017 | 0.0005 | 0.0006 |
| Water content (%) | 0.01 | 0.02 | 0.02 | 0.01 |

TABLE 3-continued

|  | Examples | | | |
|---|---|---|---|---|
|  | 9 | 10 | 11 | 12 |
| Properties of polymers | | | | |
| Mn | 15000 | 10500 | 15500 | 11500 |
| Mw/Mn | 2.7 | 4.6 | 2.7 | 3.4 |
| Copolymerization rate (mol %) | 4.9 | 54.2 | 4.9 | 54.3 |
| Appearance of injection-molded article | Good | Good | Good | Good |

EXAMPLES 13–14

As shown in Table 4, an ester (D2) was obtained by depolymerizing polyethylene terephthalate ("RT543C" available from Nippon Unipet Co., Ltd.) as the ester (D11) in the same manner as in Examples 5 and 6.

The ester (D2) was subjected to the steps (1) and (2) in the same manner as in Example 1.

TABLE 4

|  | Examples | |
|---|---|---|
|  | 13 | 14 |
| Ester (D11) | | |
| PET (mol) | 20.0 | 20.0 |
| b/a | 0.004 | 0.004 |
| molar ratio | 1.00 | 1.00 |
| Depolymerization | | |
| EG added (mol) | 20.0 | 20.0 |
| molar ratio | 2.00 | 2.00 |
| Ester (D2) | | |
| average polymerization degree | 10 | 10 |
| b/a | 0.002 | 0.002 |
| molar ratio | 1.40 | 1.40 |
| Step (1) | | |
| SPG (mol) | 1.0 | 11.0 |
| c/a | 0.05 | 0.55 |
| (b/a) × (c/a) | 0.0001 | 0.0011 |
| Water content (%) | 0.05 | 0.05 |
| Properties of polymers | | |
| Mn | 14500 | 16500 |
| Mw/Mn | 2.7 | 3.5 |
| Copolymerization rate (mol %) | 4.9 | 54.3 |
| Appearance of injection-molded article | Good | Good |

EXAMPLES 15–16

As shown in Table 5, bis(β-hydroxyethyl) terephthalate (available from Kanto Kagaku Co., Ltd.; ester (D4)) as the ester (D) was subjected to the steps (1) and (2) in the same manner as in Example 1.

TABLE 5

|  | Examples | |
|---|---|---|
|  | 15 | 16 |
| Ester (D3) | | |
| BRET (mol) | 20 | 20 |
| b/a | 0.001 | 0.001 |
| molar ratio | 2.00 | 2.00 |

TABLE 5-continued

|  | Examples | |
|---|---|---|
|  | 15 | 16 |
| Step (1) | | |
| SPG (mol) | 1.0 | 11.0 |
| c/a | 0.05 | 0.55 |
| (b/a) × (c/a) | 0.0000 | 0.0006 |
| Water content (%) | 0.05 | 0.05 |
| Properties of polymers | | |
| Mn | 14000 | 16500 |
| Mw/Mn | 2.7 | 3.3 |
| Copolymerization rate (mol %) | 4.9 | 54.4 |
| Appearance of injection-molded article | Good | Good |

EXAMPLES 17–18

The dimethyl dicarboxylate and the diol having no cyclic acetal skeleton were charged in a molar ratio shown in Table 6, and after adding 0.03 mol % of manganese acetate tetrahydrate based on the dicarboxylic acid component, the transesterification reaction was carried out by an ordinary method. After the conversion rate of the dicarboxylic acid component reached 85 mol % or higher, a predetermined amount of the diol having no cyclic acetal skeleton was distilled off at 215° C. under 13.3 kPa to obtain an ester (D3) (production method C).

The ester (D3) was subjected to the steps (1) and (2) in the same manner as in Example 1.

TABLE 6

|  | Examples | |
|---|---|---|
|  | 17 | 18 |
| Reactants charged | | |
| DMT (mol) | 26.0 | 26.0 |
| EG (mol) | 39.0 | 78.1 |
| molar ratio | 1.5 | 3.0 |
| Ester (D3) | | |
| average polymerization degree | 3 | 3 |
| b/a | 0.000 | 0.000 |
| molar ratio | 1.4 | 1.4 |
| Step (1) | | |
| SPG (mol) | 1.3 | 14.3 |
| c/a | 0.05 | 0.55 |
| (b/a) × (c/a) | 0.0001 | 0.0001 |
| Water content (%) | 0.05 | 0.05 |
| Properties of polymers | | |
| Mn | 16500 | 14500 |
| Mw/Mn | 2.6 | 3.6 |
| Copolymerization rate (mol %) | 4.9 | 54.7 |
| Appearance of injection-molded article | Good | Good |

EXAMPLES 19–20

A mixture of the ester (D1) obtained by the production method A, the diol ester of dicarboxylic acid (D2) obtained by the production method B and the ester (D3) obtained by the production method C in an amount ratio as shown in Table 7 was used as the ester (D), which was subjected to the steps (1) and (2) in the same manner as in Example 1.

TABLE 7

| | Examples | |
|---|---|---|
| | 19 | 20 |
| Ester (D1) | | |
| average polymerization degree | 35 | 70 |
| b/a | 0.030 | 0.005 |
| molar ratio | 1.15 | 1.05 |
| Ester (D2) | | |
| average polymerization degree | 10 | 12 |
| b/a | 0.014 | 0.002 |
| molar ratio | 1.40 | 1.40 |
| Ester (D3) | | |
| average polymerization degree | 3 | 3 |
| b/a | 0.000 | 0.000 |
| molar ratio | 1.40 | 1.40 |
| Mixing ratio of esters (molar ratio) | | |
| D1/D2/D3 | 1/2/3 | 1/1/1 |
| Ester (D) | | |
| average polymerization degree | 10 | 20 |
| b/a | 0.006 | 0.002 |
| molar ratio | 1.36 | 1.28 |
| Step (1) | | |
| c/a | 0.05 | 0.55 |
| (b/a) × (c/a) | 0.0000 | 0.0013 |
| Water content (%) | 0.05 | 0.05 |
| Properties of polymers | | |
| Mn | 15500 | 11500 |
| Mw/Mn | 2.7 | 4.2 |
| Copolymerization rate (mol %) | 4.8 | 54.1 |
| Appearance of injection-molded article | Good | Good |

COMPARATIVE EXAMPLES 4–5

The same procedure as in each of Examples 5 and 6 was repeated except that the removal of the diol having no cyclic acetal skeleton by the distillation at 215° C. under 13.3 kPa was not conducted.

TABLE 9

| | Comparative Examples | |
|---|---|---|
| | 4 | 5 |
| Ester (D1) | | |
| produced in | Ex. 1 | Ex. 2 |
| average polymerization degree | 35 | 70 |
| b/a | 0.030 | 0.005 |
| molar ratio | 1.15 | 1.05 |
| Depolymerization | | |
| EG (mol) | 22.1 | 24.7 |
| molar ratio | 2.00 | 2.00 |
| Ester (D2) | | |
| average polymerization degree | 7 | 8 |
| b/a | 0.035 | 0.018 |
| molar ratio | 2.00 | 2.00 |
| Step (1) | | |
| SPG (mol) | 14.3 | |
| DOG (mol) | 1.3 | |
| c/a | 0.05 | 0.55 |
| (b/a) × (c/a) | 0.0018 | 0.0099 |
| Water content (%) | 0.65 | 0.70 |

TABLE 9-continued

| | Comparative Examples | |
|---|---|---|
| | 4 | 5 |
| Properties of polymers | | |
| Mn | 10500 | 9500 |
| Mw/Mn | 7.6 | 14.7 |
| Copolymerization rate (mol %) | 4.8 | 50.0 |
| Appearance of injection-molded article | gelled | non-moldable |

In accordance with the present invention, there is provided an industrially useful process for stably producing polyester resins comprising a dicarboxylic acid constitutional unit and a diol constitutional unit having a cyclic acetal skeleton and having excellent moldability and mechanical properties by a transesterification method which is less detrimental to environments. Therefore, the present invention has a large industrial value.

What is claimed is:

1. A process for producing a polyester resin comprising a dicarboxylic acid constitutional unit and a diol constitutional unit having a cyclic acetal skeleton, the process comprising:

an oligomerization step of mainly producing oligomers by subjecting a diol (A) having a cyclic acetal skeleton and an ester (D) to transesterification reaction under conditions simultaneously satisfying the following requirements (i) to (iv):

(i) a molar ratio, b/a, of 0 to 0.035, wherein a is a molar amount of the dicarboxylic acid constitutional unit in the ester (D) and b is a molar amount of free carboxyl group in the ester (D);

(ii) a molar ratio, c/a, of 0.05 to 0.60 at initial charge, wherein a is the same as defined above and c is a molar amount of the diol (A) having a cyclic acetal skeleton;

(iii) the following formula (I):

$$0 \le (b/a) \times (c/a) \le 0.003 \quad (I)$$

wherein a, b and c are as defined above; and (iv) a water content of 0 to 0.5% by weight in the reaction system; and a step of mainly polymerizing the oligomers to the polyester.

2. The process according to claim 1, wherein the diol (A) having a cyclic acetal skeleton is at least one diol selected from the group consisting of:

compounds represented by the following formula (1):

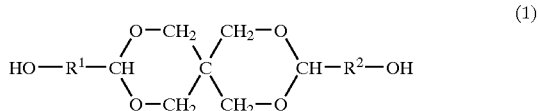

(1)

wherein $R^1$ and $R^2$ are each independently a divalent hydrocarbon group selected from the group consisting of $C_1$–$C_{10}$ aliphatic hydrocarbon groups, $C_3$–$C_{10}$ alicyclic hydrocarbon groups and $C_6$–$C_{10}$ aromatic hydrocarbon groups; and compounds represented by the following formula (2):

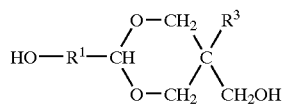
(2)

wherein $R^1$ is the same as defined above; and $R^3$ is a monovalent hydrocarbon group selected from the group consisting of $C_1$–$C_{10}$ aliphatic hydrocarbon groups, $C_3$–$C_{10}$ alicyclic hydrocarbon groups and $C_6$–$C_{10}$ aromatic hydrocarbon groups.

3. The process according to claim 1, wherein the diol (A) having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

4. The process according to claim 1, wherein the ester (D) is an ester (D1) having an average polymerization degree of from 15 to 200 which is produced from a dicarboxylic acid (B) and a diol (C) having no cyclic acetal skeleton.

5. The process according to claim 1, wherein the ester (D) is an ester (D2) having an average polymerization degree of less than 15, a melting point of 240° C. or lower, and a molar ratio of a diol constitutional unit to the dicarboxylic acid constitutional unit of 3.0 or less, the ester (D2) being produced by depolymerizing an ester (D1) or a polyester resin (D11);

the ester (D1) having an average polymerization degree of 15 to 200 which is produced from a dicarboxylic acid (B) and a diol (C) having no cyclic acetal skeleton; and the polyester resin (D11) being selected from the group consisting of polyethylene terephthalate, polybutylene terephthalate, polyethylene naphthalate, and polyethylene terephthalates copolymerized with isophthalic acid, 1,4-cyclohexane dimethanol, 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

6. The process according to claim 1, wherein the ester (D) is produced in the presence of an orthoformic acid triester and/or a carbonic acid diester in an amount of 0.01 to 0.2 mol per one mole of the dicarboxylic acid constitutional unit.

7. The process according to claim 1, wherein the ester (D) is an ester (D3) that is produced by transesterifying a dialkyl ester (E) of a dicarboxylic acid (B) and an alcohol with a diol (C) having no cyclic acetal skeleton.

8. The process according to claim 1, wherein the ester (D) is bis(β-hydroxyethyl)terephthalate.

9. The process according to claim 1, wherein the ester (D) is at least one ester selected from the group consisting of esters (D1), esters (D2), esters (D3) and bis(β-hydroxyethyl) terephthalate, the esters (D1) having an average polymerization degree of from 15 to 200 which is produced from a dicarboxylic acid (B) and a diol (C) having no cyclic acetal skeleton;

the esters (D2) having an average polymerization degree of less than 15, a melting point of 240° C. or lower, and a molar ratio of a diol constitutional unit to the dicarboxylic acid constitutional unit of 3.0 or less, which is produced by depolymerizing an ester (D1) or a polyester resin (D11) wherein the ester (D1) has an average polymerization degree of 15 to 200 and is produced from a dicarboxylic acid (B) and a diol (C) having no cyclic acetal skeleton, and the polyester resin (D11) is selected from the group consisting of polyethylene terephthalate, polybutylene terephthalate, polyethylene naphthalate, and polyethylene terephthalates copolymerized with isophthalic acid, 1,4-cyclohexane dimethanol, 3,9-bis(1,1-dimethyl-2-hydroxyethyl)-2,4, 8,10-tetraoxaspiro[5.5]undecane or 5-methylol-5-ethyl-2-(1,1-dimethyl-2-hydroxyethyl)-1,3-dioxane.

10. The process according to claim 1, further comprises a step of molding the polyester resin into shaped articles.

* * * * *